United States Patent
Gizowski et al.

[11] Patent Number: 5,853,577
[45] Date of Patent: Dec. 29, 1998

[54] ORBITAL VIBRATION WELDED FILTER

[75] Inventors: John W. Gizowski, Lagrange Park; Glenn T. Gajda, Grayslake; Daniel J. Morrison, Arlington Heights; Louis P. Macino, Carol Stream; Joseph A. Geisler, Des Plaines, all of Ill.

[73] Assignee: SPX Corporation, Muskegon, Mich.

[21] Appl. No.: 934,677

[22] Filed: Sep. 22, 1997

[51] Int. Cl.⁶ .......................... B01D 35/30; B01D 35/027; B01D 29/23
[52] U.S. Cl. ...................... 210/168; 210/416.5; 210/445; 156/73.5; 55/511
[58] Field of Search .......................... 156/73.5; 210/168, 210/445, 416.5; 55/511

[56] References Cited

U.S. PATENT DOCUMENTS

| | | |
|---|---|---|
| 3,480,149 | 11/1969 | Houser . |
| 3,800,943 | 4/1974 | Riesbeck . |
| 3,932,153 | 1/1976 | Byrns . |
| 3,954,625 | 5/1976 | Michalski . |
| 4,009,715 | 3/1977 | Forberg . |
| 4,157,967 | 6/1979 | Meyst . |
| 4,170,056 | 10/1979 | Meyst . |
| 4,177,149 | 12/1979 | Rosenberg . |
| 4,326,957 | 4/1982 | Rosenberg . |
| 4,341,538 | 7/1982 | Vadnay et al. . |
| 4,402,287 | 9/1983 | Cochran . |
| 4,402,341 | 9/1983 | Reip . |
| 4,402,827 | 9/1983 | Joseph . |
| 4,450,081 | 5/1984 | Anderson et al. ...................... 210/445 |
| 4,543,187 | 9/1985 | Steppacher ................ 210/232 |
| 4,600,511 | 7/1986 | Sherman . |
| 4,666,594 | 5/1987 | Schneider ................ 210/168 |
| 4,804,466 | 2/1989 | Cooper . |
| 4,826,598 | 5/1989 | Cain .......................... 210/445 |
| 4,828,694 | 5/1989 | Leason . |
| 4,869,815 | 9/1989 | Markl ...................... 210/168 |
| 4,889,621 | 12/1989 | Yamada . |
| 4,948,442 | 8/1990 | Manns . |
| 5,015,555 | 5/1991 | Sager ...................... 156/73.1 |
| 5,049,274 | 9/1991 | Leason et al. .......... 210/445 |
| 5,108,709 | 4/1992 | Bugar . |
| 5,269,917 | 12/1993 | Stankowski ............. 210/232 |
| 5,292,432 | 3/1994 | Jainek . |
| 5,494,575 | 2/1996 | Kitajima . |
| 5,538,633 | 7/1996 | Kitajima et al. ........ 210/445 |

*Primary Examiner*—Thomas M. Lithgow
*Attorney, Agent, or Firm*—Barnes, Kisselle, Raisch, Choate, Whittemore & Hulbert, P.C.

[57] ABSTRACT

A fluid filter comprising a housing having first and second plastic cover members each having a peripheral flange and joined together to define a housing chamber having an inlet and an outlet. A filtration media is disposed in the housing chamber between the inlet and the outlet. The peripheral flange of the first cover member has a rib. The peripheral flange of the second cover member has a gutter opposed to the rib. The filtration media has an edge portion compressed between the rib and the gutter to form a marginal seal preventing fluid entering the inlet from reaching the outlet without passing through the filtration media. The edge portion of the filtration media is pierced and anchored by spikes which project from the rib and extend into the gutter. One of the cover members has a welding rib welded to the other cover member by a process of orbital frictional vibration welding to secure the cover members together.

4 Claims, 4 Drawing Sheets

ORBITAL VIBRATION WELDED FILTER

FIELD OF THE INVENTION

This invention relates generally to fluid filters and more particularly to hermetically sealed fluid filters and a method of manufacturing the same.

BACKGROUND OF THE INVENTION

Filters are employed to remove sediment from the fluid circulating through an automatic transmission of an automotive vehicle. Filters used for such purpose have a housing provided with an inlet to receive fluid from a sump and an outlet through which fluid is conveyed to a pump which circulates the transmission fluid. As the fluid enters the housing, it flows through a filtration media which removes any sediment.

One of the problems that a transmission suction filter design must address has been to insure that none of the fluid flowing through the housing bypasses the filtration media, in other words, that all fluid passes through the filtration media before reaching the outlet.

Typically, the housing is made of two cover members peripherally secured together. Another problem that a transmission suction filter design must address has been to provide a hermetic seal between the cover members so that no air can enter the filter housing.

SUMMARY OF THE INVENTION

In accordance with the present invention, a fluid filter is provided comprising a housing including two cover members peripherally joined together to define a housing chamber having an inlet and an outlet. Filtration media is disposed within the housing between the inlet and the outlet. The flange of one of the cover members has a rib projecting toward the flange of the other cover member. The other cover member has a gutter or groove opposed to the rib. The filtration media has an edge portion which is compressed between the rib and the gutter to form a seal preventing fluid entering the inlet from reaching the outlet without passing through the filtration media. To more effectively secure the edge portion of the filtration media between the rib and the gutter, one of the cover members has a series of spikes which engage the edge portion of the filtration media. Preferably, the spikes project from the rib into the gutter formation.

Preferably, the cover members are made of plastic and one has a peripheral welding rib spaced from the rib and gutter formations and welded to the other cover member by a process of orbital frictional vibration welding. Welding by this process forms an effective hermetic seal between the cover members.

One object of this invention is to provide a fluid filter and a method having the foregoing features and capabilities.

Another object is to provide a fluid filter which is composed of a relatively few simple parts, is rugged and durable in use, and is capable of being inexpensively manufactured and assembled.

Other objects, features and advantages of the invention will become more apparent as the following description proceeds, especially when considered with the accompanying drawings.

DETAILED DESCRIPTION OF THE PREFERRED EMBODIMENT

Figure 1:
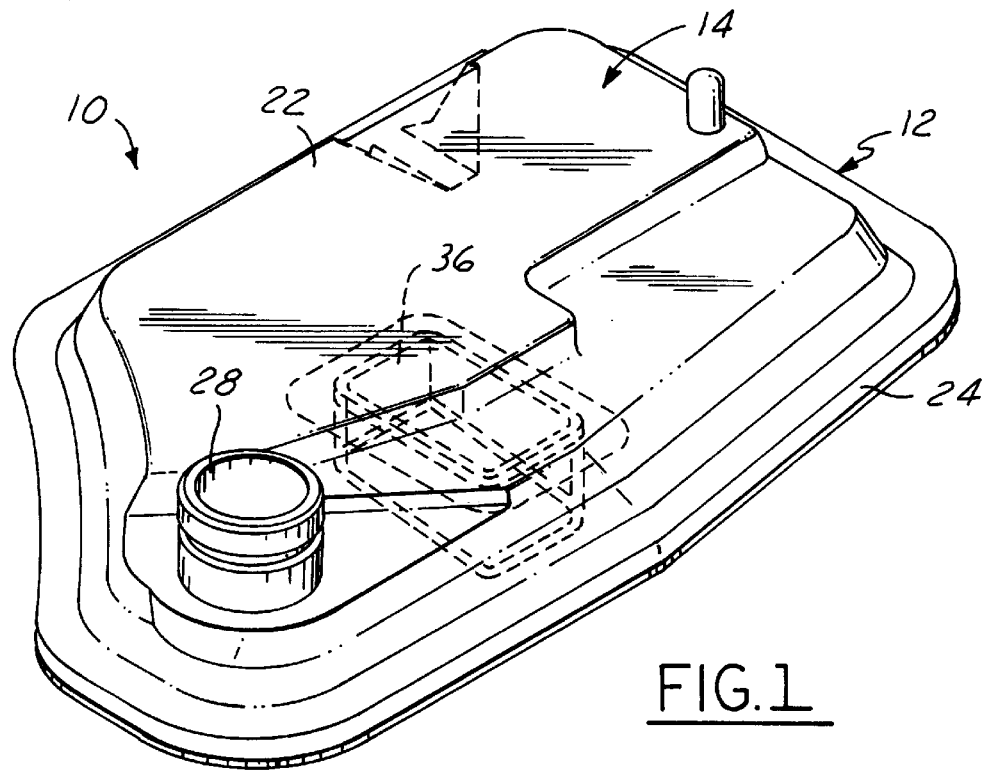
FIG. 1 is a perspective view of a fluid filter constructed in accordance with the invention.

Referring now more particularly to the drawings, the filter 10 is intended for use in an automatic transmission of an automotive vehicle and comprises a housing 12 having thermoplastic top and bottom cover members 14 and 16 defining a housing chamber 18, and a filtration media 20 in the housing chamber.

The top cover member 14 is dish-shaped, having a top wall 22 and a peripheral flange 24. Fluid flow deflectors 26 are integrally formed on the inner surface of the top wall 22. An outlet 28 in the top wall leads to a pump (not shown) for circulating transmission fluid.

The bottom cover member 16 is dish-shaped, having a bottom wall 30 and a peripheral flange 32. The peripheral flanges 24 and 32 of the top and bottom cover members 14 and 16 are secured together as will be more fully described. Fluid flow deflectors 34 are integrally formed on the inner surface of the bottom wall 30. A transmission fluid inlet 36 is formed in the bottom wall.

The filtration media 20 is preferably a phenolic resin-impregnated sheet of fibrous polyester material which in this instance is doubled over along the fold line 38 to form top and bottom filtration layers 40 and 42. The edge portion 44 of the double layer filtration media extends from one end 48 of the fold line 38 completely around to the other end 50. The edge portion 44 of the filtration media extends between the peripheral flanges 24 and 32 of the two cover members. Other filter designs are possible in which only a single layer of filtration media is employed.

The peripheral flange 32 of the bottom cover member 16 has an elongated rib 52 on its inner surface which is spaced laterally inwardly from the outer perimeter of the bottom cover member. The rib 52 extends toward the peripheral flange 24 of the top cover member 14 and may extend completely around the peripheral flange 32 or at least along the full extent of the edge portion 44 of the filtration media 20.

The peripheral flange 24 of the top cover member 14 has an elongated gutter or groove 54 in its inner surface which is spaced laterally inwardly from the outer perimeter of the top cover member. The gutter 54 opens toward the peripheral flange 32 of the bottom cover member and is directly opposed to the rib 52. The gutter 54 may extend completely around the peripheral flange 24 or at least along the full extent of the edge portion 44 of the filtration media.

Figure 4:
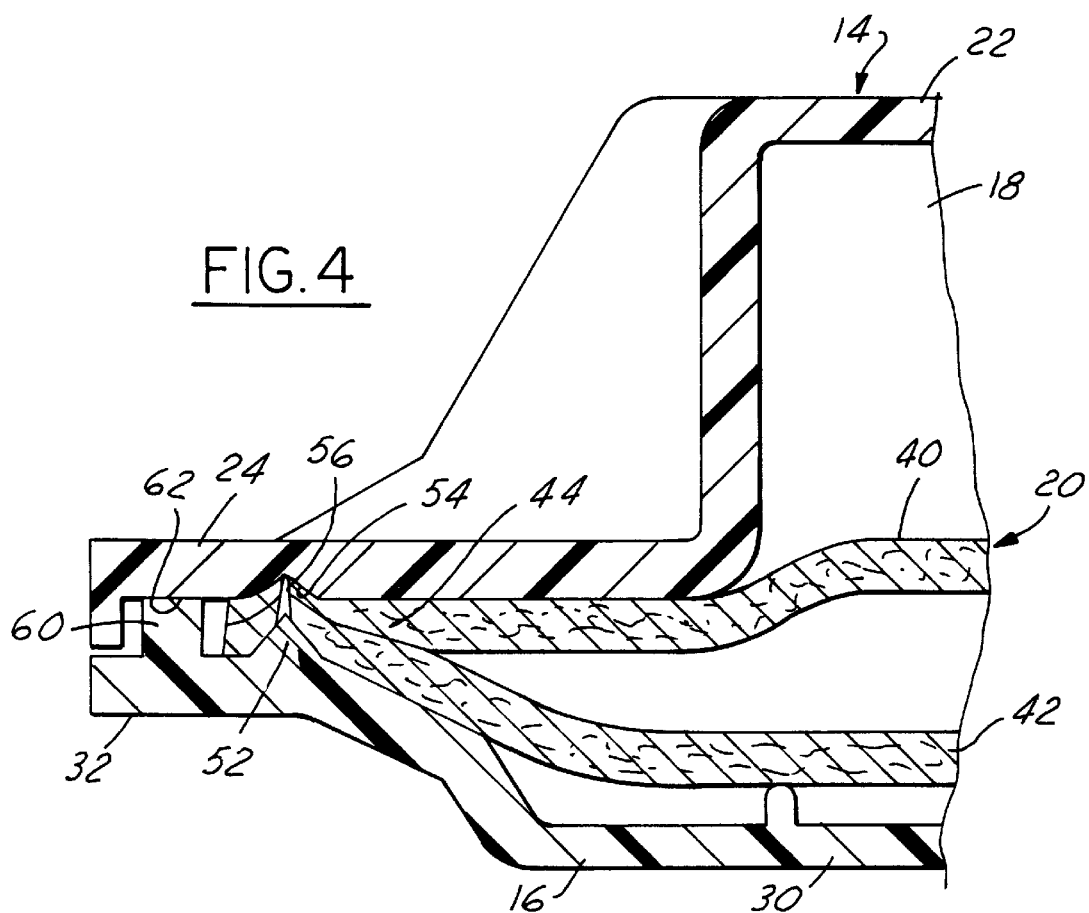
FIG. 4 is a sectional view taken on the line 4—4 in FIG. 3.
Figure 2:
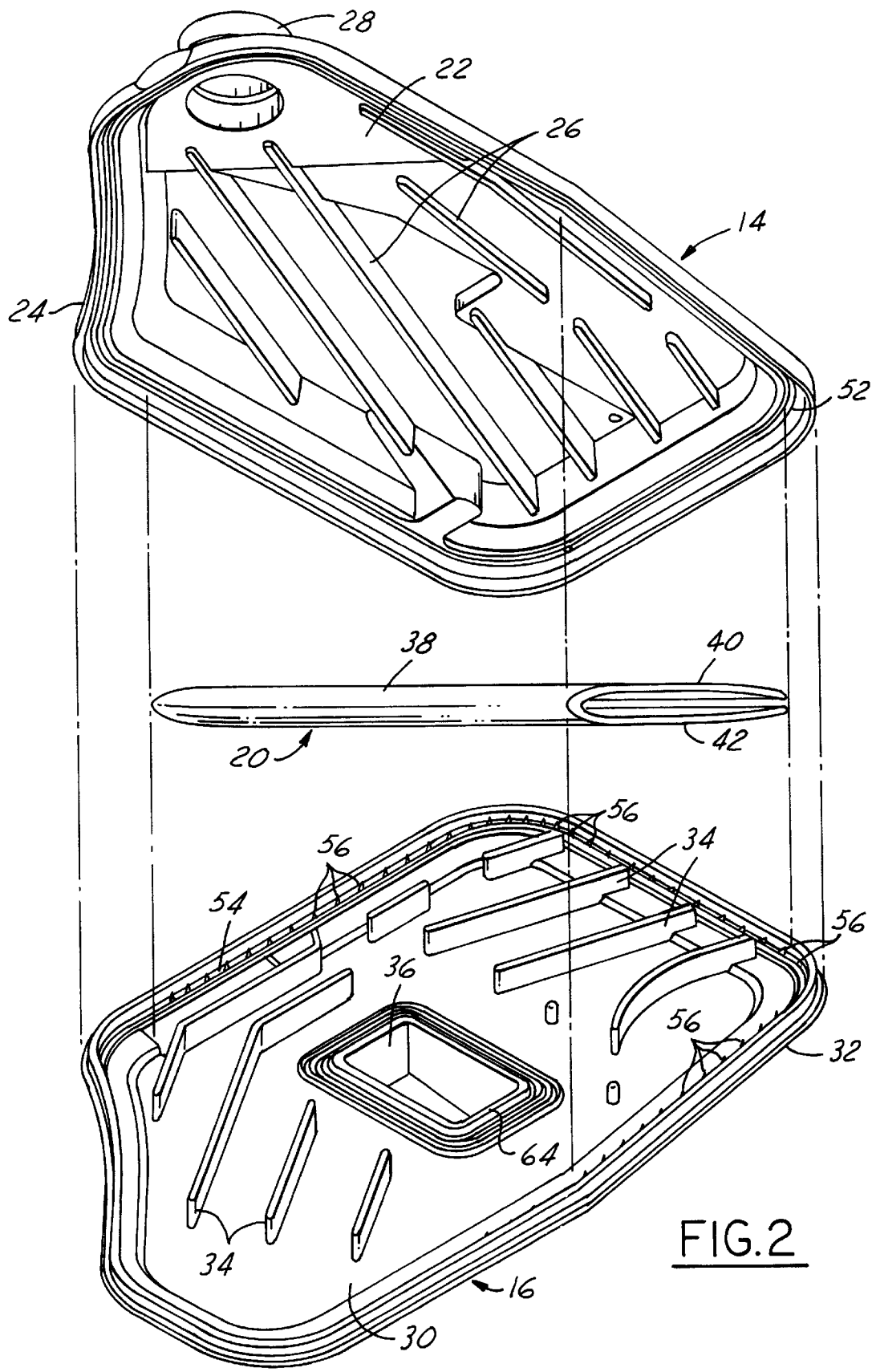
FIG. 2 is an exploded view showing the top cover member, bottom cover member and filtration media which are parts of the fluid filter.
Figure 3:
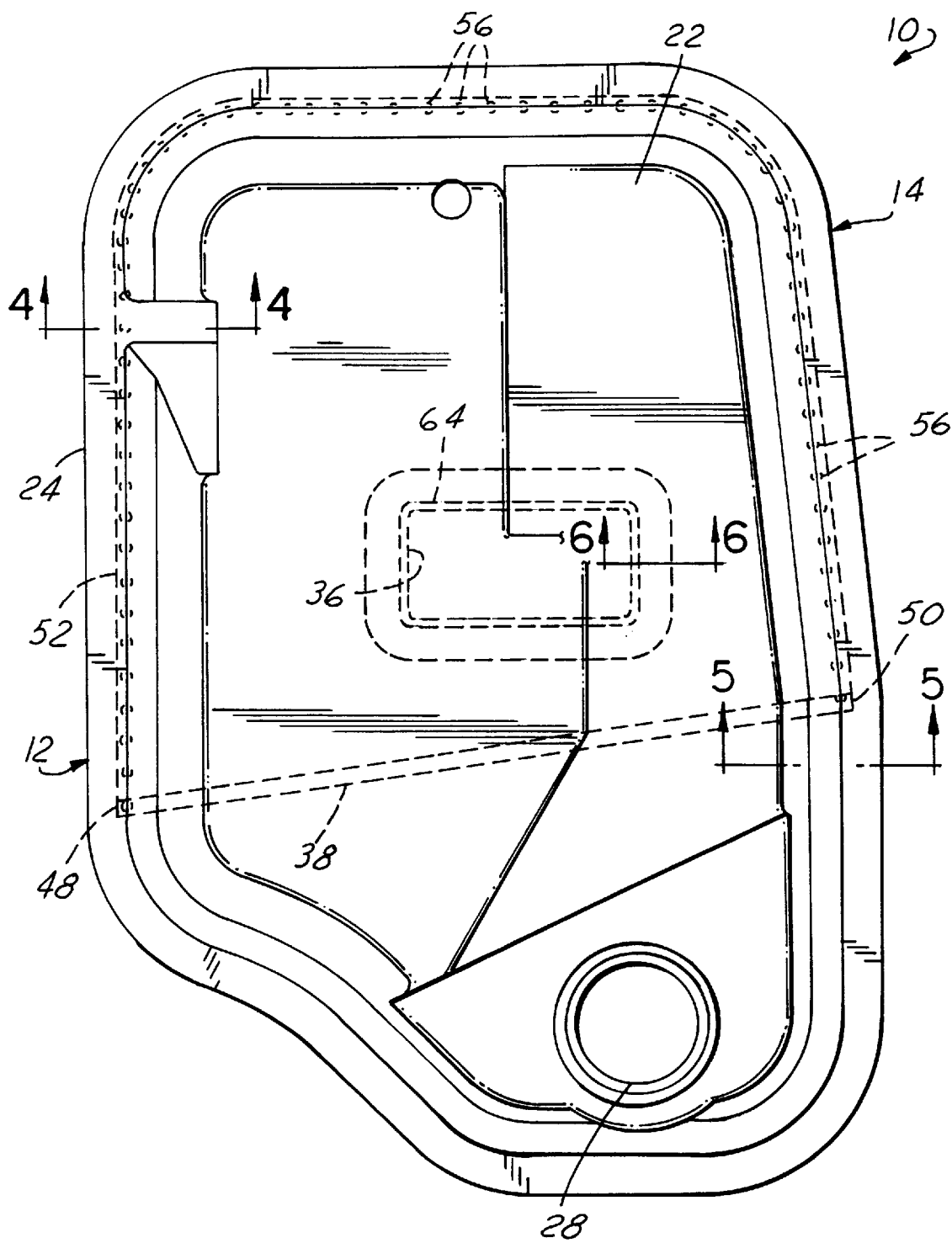
FIG. 3 is a top plan view of the fluid filter.
Figure 5:
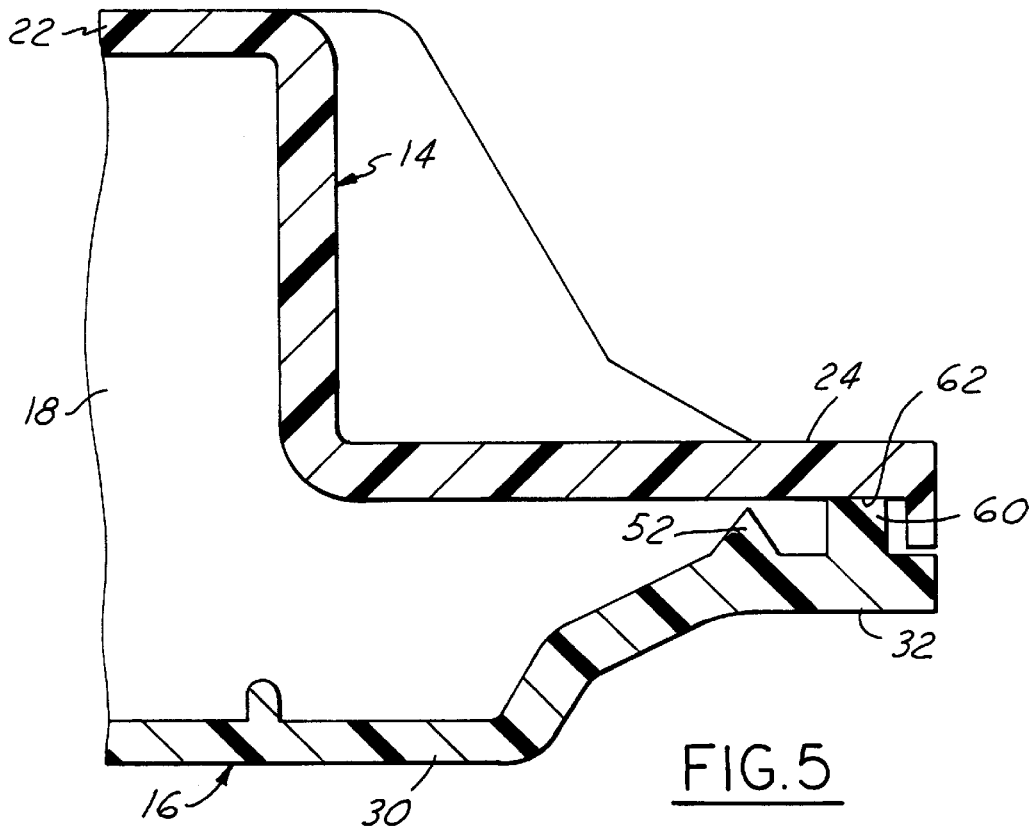
FIG. 5 is a sectional view taken on the line 5—5 in FIG. 3.

A series of spikes 56 formed integrally with the rib 52 are spaced apart equal distances along the length of the rib. The spikes 56 project toward the peripheral flange 24 of the top cover member 14 and are adapted to extend into the gutter 54 and in fact contact the bottom of the gutter in the assembled relationship of the cover members. See FIG. 4. The edge portion 44 of the filtration media extends between the peripheral flanges 24 and 32 and across the rib 52 and gutter 54. In the assembled condition of the filter, the edge portion 44 of the filtration media is compressed between the rib 52 and gutter 54 to form a seal preventing fluid entering the inlet 36 from reaching the outlet 28 without passing through the filtration media. The edge portion 44 of the filtration media is pierced and anchored or retained by the spikes 56.

The peripheral flange 32 of the bottom cover member 16 has an integral, annular, welding rib 60 on its inner surface which projects toward the peripheral flange 24 of the top cover member 14. In this particular design, the welding rib 60 is spaced laterally outwardly from the gutter 54. The inner surface 62 of the peripheral flange 24 of the top cover member 14 is smooth and is opposed to the welding rib 60. When the over members are assembled, the welding rib 60 closely surrounds the edge portion 44 of the filtration media 20 to locate the same.

Figure 6:
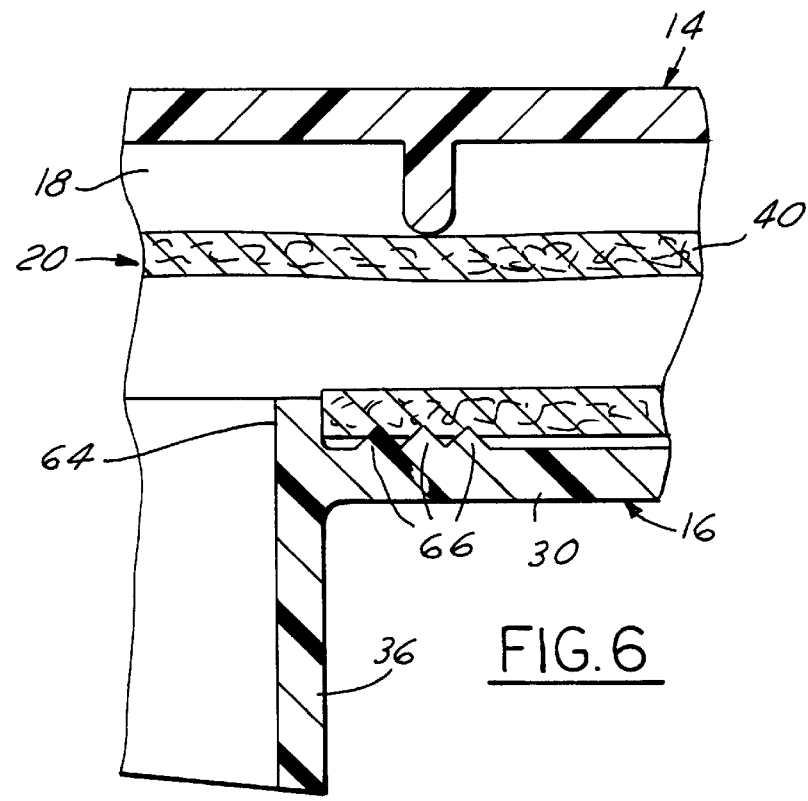
FIG. 6 is a sectional view taken on the line 6—6 in FIG. 3.

The fluid inlet 36 in the bottom wall 30 of the bottom cover member 16 has an annular rim 64 (FIG. 6) projecting up into the housing chamber 18. A plurality of annular ridges 66, of inverted V-shape in cross section, surround the rim 64 and project upwardly from the bottom wall 30. The bottom layer 42 of the filtration media has an opening 68 surrounding the rim 64. The ridges 66 contact the bottom layer 42 of the folded filtration media and form a hermetic seal around the fluid inlet 36 after sonic welding is employed to form the seal around the inlet. Sonic welding involves applying a rapidly repetitive force, which is generated by a sonic welding horn, to the filtration media.

After the sonic welding of the filtration media 20 to the bottom wall 30 of the bottom cover member 16, the top cover member 14 is assembled over the bottom cover member 16 in the relationship shown in FIGS. 1 and 3–6, with the peripheral flanges 24 and 32 of the two cover members opposed to one another and the edge portion 44 of the filtration media 20 clamped between the rib 52 and gutter 54. A process of orbital frictional vibration welding is then employed to secure the top and bottom cover members together.

The welding process is accomplished by applying a clamping force to the top and bottom cover members so that the edge portion 44 of the filtration media 20 is compressed between the rib 52 and the gutter 54, with the spikes 56 projecting through the edge portion 44 and contacting the bottom of the gutter, and the welding rib 60 contacting the smooth inner surface 62 of the peripheral flange 24 of the top cover member 14. The vibration apparatus then causes one of the cover members to rotate in a plane generally parallel to a joint line between the cover members, while holding the other cover member stationary. This orbital movement creates friction between the welding rib 60 and the smooth surface 62 of the peripheral flange 24 of the top cover member 14, the friction producing a melting and welding together of the thermoplastic material of the welding rib 60 and the peripheral flange 24. This welding together is complete throughout the entire circumference of the welding rib to provide a hermetic seal excluding the entrance of air into the housing chamber. Also, the spikes 56 are welded to the bottom of the gutter 54 by this process.

After the melting and welding together of the parts, the orbital motion is discontinued, although the clamping force may be continued for a time sufficient to allow the melted parts to solidify and perfect the hermetic seal. The edge portion 44 of the filtration media is compressed between the rib 52 and the gutter 54 to form a seal insuring that none of the fluid flowing through the housing by-passes the filtration media. All of the fluid entering the housing inlet 6 flows into the space between the filtration layers 40 and 42 of the filtration media 20, passes through filtration media and exits by way of the outlet 28.

What is claimed is:

1. A fluid filter comprising:

a housing including first and second cover members each having a peripheral flange, the peripheral flanges of said cover members being joined together to define a housing chamber having an inlet and an outlet, a filtration media disposed in the housing chamber between said inlet and said outlet, the flange of said first cover member having a rib formation projecting toward the flange of said second cover member, and a series of filtration media retention spikes which project from said rib formation and engages with an edge portion of the filtration media;

the flange of said second cover member having a gutter formation opposed to said rib formation, and said filtration media having said edge portion compressed between said rib and said gutter formations to form a seal preventing fluid entering said inlet from reaching said outlet without passing through said filtration media.

2. A fluid filter as defined in claim 1, wherein said cover members are plastic and one of said cover members has a peripheral welding rib spaced from said rib and gutter formations and welded to the other of said cover members by a process of orbital frictional vibration welding.

3. A method forming a fluid filter comprising the steps of:

(a) providing first and second plastic cover members, each having peripheral flanges which, when joined together, form a housing, the peripheral flange of the first cover member having a rib formation, with a series of filtration media retention spikes projecting from the rib formation, and the flange of the second cover member having a gutter formation opposed to said rib formation, and the peripheral flange of one of said cover members having a welding rib projecting toward the peripheral flange of the other cover member;

(b) providing a filtration media having an edge portion;

(c) assembling the filtration media and cover members by placing the filtration media between the cover members such that the edge portion of the filtration media is captured and compressed between said rib and gutter formations, with the spikes extending into the gutter formation, and the welding rib contacts the peripheral flange of said other cover member; and (d) then subjecting the assembled cover members to a process of orbital frictional vibration welding to form a seal between the welding rib and said other cover member.

4. A method as defined in claim 3, wherein said spikes are welded to said gutter formation by said process of orbital frictional vibration welding.

* * * * *